United States Patent
Beiriger et al.

(10) Patent No.: US 10,402,295 B1
(45) Date of Patent: Sep. 3, 2019

(54) AUTOMATED DETERMINATION, NOTIFICATION, AND ACQUISITION OF PERIPHERAL-RELATED ITEMS

(71) Applicant: Staples, Inc., Framingham, MA (US)

(72) Inventors: Elizabeth A. Beiriger, Watertown, MA (US); Bolivar E. Bravo, Somerville, MA (US); Gustavo A. Pospischel, Westborough, MA (US); Robert M. Levangie, Medfield, MA (US)

(73) Assignee: Staples, Inc., Framingham, MA (US)

( * ) Notice: Subject to any disclaimer, the term of this patent is extended or adjusted under 35 U.S.C. 154(b) by 558 days.

(21) Appl. No.: 14/292,650

(22) Filed: May 30, 2014

Related U.S. Application Data

(60) Provisional application No. 61/829,995, filed on May 31, 2013.

(51) Int. Cl.
*G06F 3/00* (2006.01)
*G06F 11/30* (2006.01)

(52) U.S. Cl.
CPC .................. *G06F 11/3065* (2013.01)

(58) Field of Classification Search
CPC ................................................. G06F 11/3065
USPC ........................................................ 710/19
See application file for complete search history.

(56) References Cited

U.S. PATENT DOCUMENTS

| | | | | |
|---|---|---|---|---|
| 6,006,193 | A * | 12/1999 | Gibson | G06Q 10/06316 705/7.26 |
| 6,405,178 | B1 * | 6/2002 | Manchala | G06Q 10/087 705/26.1 |
| 6,937,999 | B1 | 8/2005 | Haines et al. | |
| 6,965,871 | B1 * | 11/2005 | Szabo | G06Q 10/087 186/56 |
| 2004/0225732 | A1 * | 11/2004 | Coons | G06Q 10/06 709/224 |
| 2005/0192817 | A1 * | 9/2005 | Sorenson | G06Q 20/203 705/26.1 |
| 2009/0157535 | A1 * | 6/2009 | Choiniere | G06Q 10/06 705/30 |
| 2011/0188070 | A1 * | 8/2011 | Pala | G06F 15/00 358/1.15 |
| 2014/0223316 | A1 * | 8/2014 | Anderson | H04L 43/0817 715/736 |

\* cited by examiner

*Primary Examiner* — Chun Kuan Lee
(74) *Attorney, Agent, or Firm* — Patent Law Works LLP

(57) ABSTRACT

In an example implementation, a method automatically determines items related to various computer peripherals for purchase, suggestion, or promotion by determining the identity of the peripherals, providing customized notifications for a status of the peripherals, and facilitating the convenient purchase of such items using a unified interface experience. These peripherals may be printers of various different brands and the items may be ink or toner cartridges.

42 Claims, 15 Drawing Sheets

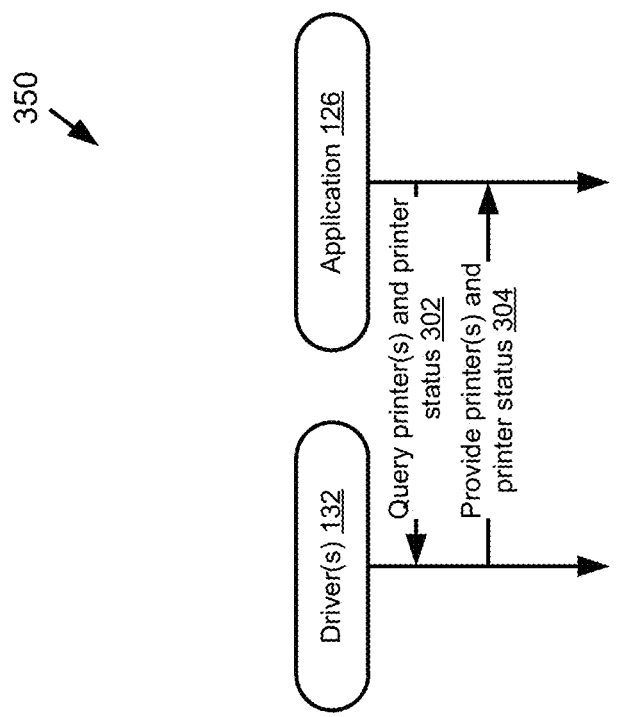
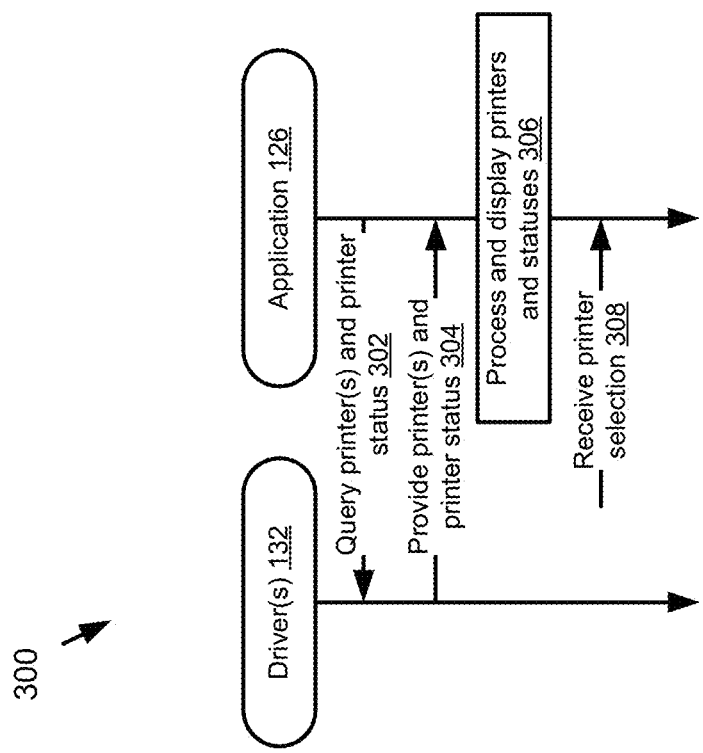
Figure 3A
Figure 3B

AUTOMATED DETERMINATION, NOTIFICATION, AND ACQUISITION OF PERIPHERAL-RELATED ITEMS

CROSS-REFERENCE TO RELATED APPLICATIONS

This application claims the benefit under 35 U.S.C. § 119(e) of U.S. Provisional Application No. 61/829,995, entitled "Automated Determination, Notification, and Acquisition of Printer-Related Items", filed on May 31, 2013, the entire contents of which is incorporated herein by reference.

BACKGROUND

Printer manufacturers often provide printer status information to their users via desktop notifications. For instance, a user may receive a pop-up in his/her taskbar that indicates when a printer is running low on ink or toner. However these pop-ups are driver-specific, limited to single manufacturer, and generally non-customizable. As a result, if a user has several different brands of printers installed on a network and/or device, the user is typically unable to check the status of all of his/her printers in a unified interface and may have to install separate services for each printer and/or printer manufacturer to receive status information for those printers. These disadvantages are further exacerbated in a corporate environment when numerous (e.g., tens, hundreds, thousands, etc.) printers of different makes may be installed on a network. In these more complex environments, users (e.g., facilities personnel) are generally relegated to manually checking each of the printers for toner information or installing numerous different tracking applications in order to effectively track the status of those printers.

In addition, while some existing solutions may notify a user when a particular make of printer is out of ink or toner, and allow the user to click through various dialogs to order replacement cartridges, these solutions fail to interface with multiple different printer makes (e.g., HP®, Epson®, Brother®, etc.) to provide comprehensive up-to-date status information (e.g., ink levels) for all available printers. They also fail to provide ordering options for ordering cartridges for any of these makes from a unified interface and generally lack configuration options to allow a user to customize notifications based on certain needs (e.g., business needs, policies, requirements, etc.).

SUMMARY

The subject matter described in this disclosure in general relates to automatically determining the identity of computer peripherals, notifying a user of statuses related to those peripherals, and helping the user acquire items related to the peripherals, for example. According to one innovative aspect of the subject matter of this disclosure, a method identifies a peripheral computing device, queries the drivers associated with the peripheral, and then suggests items associated with the peripheral to a user. The method may query a number of different drivers associated with different brands or types of peripherals in order to present them in a unified interface. These peripherals may be printers or other types of peripherals. The user may customize the notifications and the thresholds at which the notifications are triggered. The method may facilitate the user's acquisition of the suggested item by presenting the items in a list for purchase on an application or by directing the user to a website. The assortment of suggested items may be based on user preferences.

The innovative technology discussed herein provides numerous benefits including, but not limited to, intelligently and automatically determining peripheral-related items for purchase or suggestion regardless of manufacturer, automatically notifying users of components that need replacing based on customized settings, providing a unified replacement parts ordering experience, streamlining and customizing the ordering experience based on perceived and/or actual needs, and allowing management of the peripherals and orders in a multi-user environment.

BRIEF DESCRIPTION OF THE DRAWINGS

The following description describes the technology using various non-liming implementations and examples, some of which are depicted in the figures of the accompanying drawings in which like reference numerals are used to refer to similar elements.

FIGS. 3A, 3B, and 3C are signal diagrams illustrating example methods for automatically detecting available printers, determining printer related items for purchase or suggestion based on the status of those printers, and facilitating the purchase of those items using a seamless customer experience.

DETAILED DESCRIPTION

Figure 1:
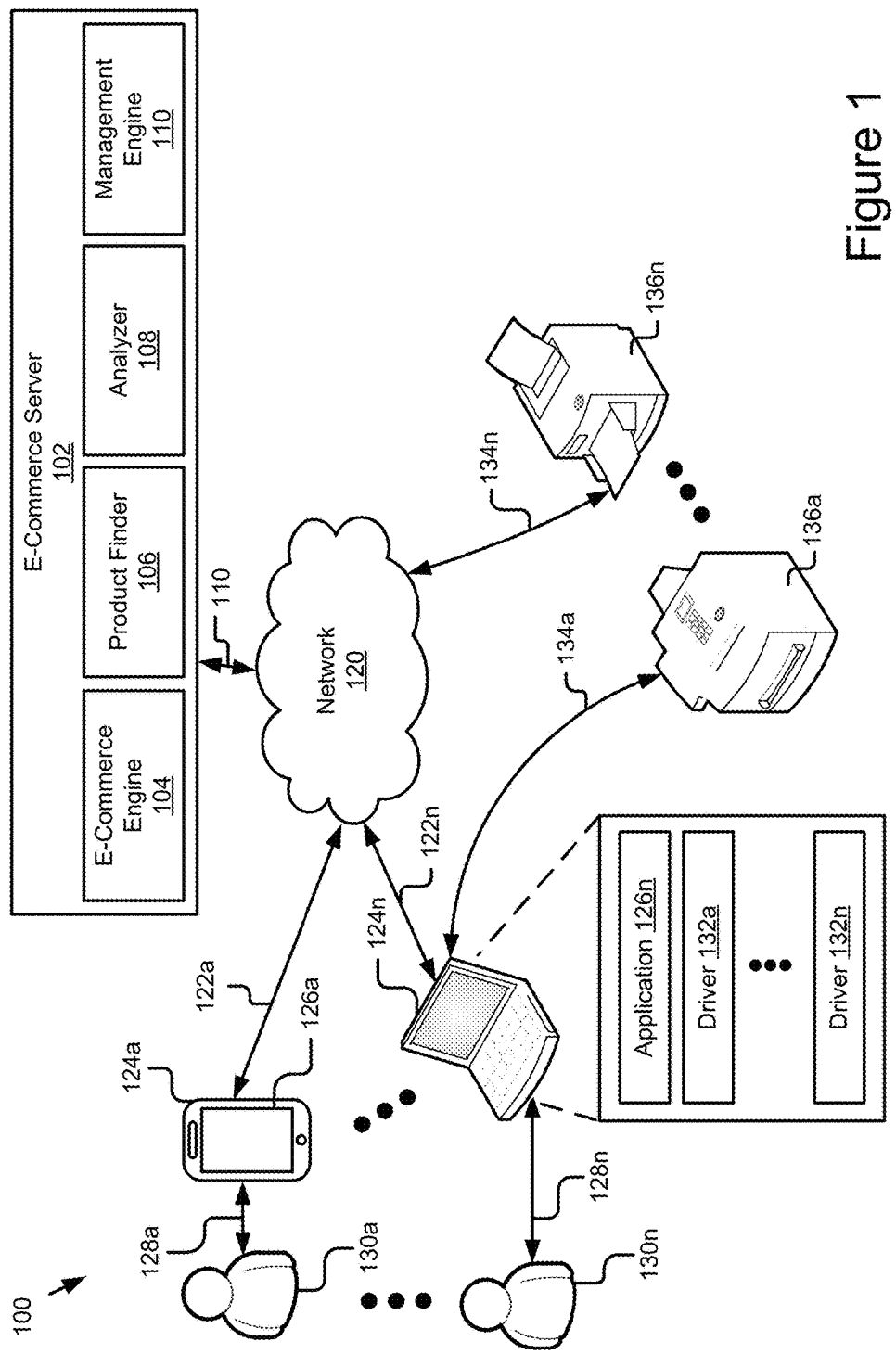
FIG. 1 is a block diagram illustrating an example system for automatically determining peripheral-related items for purchase or suggestion.

FIG. 1 is a block diagram of an example system 100 for, among other things, automatically determining peripheral-related items for purchase or suggestion, providing users with custom notifications of items that are in need of replacement, and facilitating convenient purchase of those items via a unified and/or seamless application experience. Various implementations are described herein in terms of printers with replaceable ink cartridges, however, it should be understood that peripherals other than printers are contemplated. For instance, a peripheral could include a printer, a 3d printer, a projector, a laptop, a tablet computer, an input device such as a mouse or a keyboard, or any other suitable device. In some implementations, management of many peripherals (of the same or of different types) is possible. For instance, the one or more peripherals includes a plurality of printers of different types. The following description also refers to ink and ink levels, but it should be understood that other similar threshold levels are applicable, such as toner level, ink level, paper level, battery level or health, projector bulb life, light bulb life, peripheral age or health, peripheral deterioration, storage capacity, memory usage, fluid level, and/or any other threshold and/or quantity that can be measured and is associated with a peripheral. In some implementations, the one or more peripherals includes a plurality of peripherals requiring different components.

The illustrated system 100 includes an e-commerce server 102 and one or more client devices 124a . . . 124n (also individually and collectively referred to herein as 124), which are electronically communicatively coupled via a network 120 for interaction with one another, although other system configurations are possible including other devices, systems, and networks. For example, the system 100 could include any number of servers 102, client devices 124, and/or other systems and devices. The user devices 124a . . . 124n and their components may be coupled to the network 120 via signal lines 122a . . . 122n, and the e-commerce server 102 and its components may be coupled to the network 120 via signal line 110. Users 130a . . . 130n (also individually and collectively referred to herein as 130) may access one or more of the devices of the system 100. For example, as depicted, the users 130a . . . 130n may access the user devices 124a . . . 124n as illustrated by lines 128a . . . 128n.

The network 120 may include any number of networks and/or network types. For example, the network 120 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer (P2P) networks, various combinations thereof, etc. For example, the network 120 may transmit data using user datagram protocol (UDP), transmission control protocol (TCP), HTTP, HTTPS, file transfer protocol (FTP), WebSocket (WS), WAP, IMAP, SMTP, POP, SMS protocol, MMS protocol, XMS protocol, or other known protocols.

The client devices 124 are computing devices having data processing and data communication capabilities. The client devices 124 may include one or more processors, memories, communication units, input and output devices, displays, and other hardware components as later described in reference to at least FIG. 2. Non-limiting examples of client devices 124 include a tablet computer, a smartphone, a workstation computer, a desktop computer, a laptop computer, a netbook computer, a set-top box/unit, a gaming system, a server, a server appliance, an Internet Protocol-connected smart TV including a computer processor capable of receiving viewer input, accessing video content on computer networks (e.g., the Internet), and executing software routines to provide enhanced functionality and interactivity to viewers, and the like. In some implementations, the client device 124 can be a handheld wireless computing device which is capable of sending and receiving voice and/or data communications.

The client devices 124a . . . 124n may be coupled directly or indirectly to one or more peripherals, such as the printers 136a . . . 136n (also referred to herein individually and collectively as 136), although it should be understood that other types of peripherals may be used/included, as noted elsewhere herein. Each client device 124 may be coupled to one or more printers 136, and each printer 136 may be coupled to one or more client devices 124. The printers 136 may include any variety of printers including ink-jet printers, laser printers, multi-function printers, fax machines, 3D printers, etc. In some cases, the client device 124a may be coupled indirectly via the network and/or the client device 126n to the printers 136a . . . 136n. In further cases, example, the client device 124n may be coupled via any type of direct connection (e.g., USB) 134a to printer 136a and may be coupled via the network 120 and signal line 134n to printer 136n. It should be understood that these examples are provided by way of illustration and that numerous other configurations are contemplated and that the system 100 may include any number and combination of printers 136 and client devices 124.

A client device, such as the client device 124n, may include, among other components, an application 126, and one or more drivers 132a . . . 132n. In some implementations, the drivers 132a . . . 132n may also or alternatively be stored on a server 102 or on the cloud. In some implementations, the application 126 and the one or more drivers 132a . . . 132n are sets of instructions executable by a processor of the client device 124, or logic included in one or more customized processors of the client device 124, to provide their respective functionalities. In some implementations, the application 126 and the one or more drivers 132a . . . 132n are stored in a non-transitory memory of the client device 124 and are accessible and executable by a computer processor to provide their respective functionalities. In any of these implementations, the application 126 and the one or more drivers 132a . . . n are adapted for cooperation and communication with the processor and other components of the client device 124. In some implementations, the drivers may be cloud-based and stored and operable by one or more computing devices coupled to and accessible via the network 120. For instance, an application 126 may interact with one or more drivers 132 via the network 120 using APIs exposed thereby.

The application 126 may include routines for automatically determining what peripheral (e.g., printer) components may need to be reordered, facilitating the purchase of those products, and allowing users to customize settings establishing when, for what components and/or peripherals, and/or to whom notifications should be sent. In some implementations, the application 126 is peripheral agnostic, meaning that the application 126 may interact with any peripheral available to the client device 124 regardless of the make or model of the printer. The application 126 may interact with one or more peripheral drivers 132a . . . 132n (also referred to herein individually and collectively as 132) to determine the status of the peripherals to which the drivers 132 correspond, and may interact with the e-commerce server to receive a list of customized replacement products, recommendations, and promotions, and may facilitate the purchase of those products. These acts and functionality may be provided by the application 126 via a unified experience, such as one using the example interfaces depicted in FIGS.

7 and 9-14B. The peripheral drivers 132a . . . 132n may respectively interact with peripherals 136a . . . 136n to determine the operational status and overall health of the peripherals 136 and/or their constituent components (e.g., printer cartridges, nozzles, rollers, etc.). Additional structure, acts, and/or functionality of the application 126 are depicted in FIGS. 2-14B, and described in further detail below.

The e-commerce server 102 may include one or more computing devices having data processing, storing, and communication capabilities. For example, the ecommerce server 102 may include one or more hardware servers, server arrays, storage devices and/or systems, etc. In some implementations, the e-commerce server 102 may include one or more virtual servers, which operate in a host server environment and access the physical hardware of the host server including, for example, a processor, memory, storage, network interfaces, etc., via an abstraction layer (e.g., a virtual machine manager).

As shown in the depicted implementation, the e-commerce server 102 may include an e-commerce engine 104, a product finder 106, an analyzer 108, and/or a management engine 110. The components 104, 106, 108, and 110 may be included in the same computing device or group of computing devices, distributed across two or more computing devices located in different locations, etc. In some implementations the e-commerce server 102 may include all of the components 104, 106, 108, and 110 or it may include only some of these components while others are either not present or are located on another device such as a client device 124n or another server.

In some implementations the e-commerce engine 104 may be operable to provide an e-commerce service/marketplace for various products and may store and provide access to product information (e.g., images, descriptions, categories, specifications, reviews, ratings, retailers, etc.) in a data store. The e-commerce engine 105 may also place and provide for order fulfillment for the products including order delivery status and item returns. For example, a user may place orders for and/or pay for products ordered on an e-commerce marketplace using the application 126n (e.g., a mobile app, a website, a native application) on a client device 124n, via a call center, on a kiosk or point of sale device in a store, etc.

In some implementations, the product finder 106 may receive a query from the application 126 and process the query to determine which peripheral-related items should be provided to the user, and may then provide the results to the application 126 for processing and display to the user. In some implementations, the analyzer 108 may determine preferences or needs based on user or corporate preference data, past purchases, and/or other information. The product finder 106 and the analyzer 108 are described further herein at least in reference to at least FIG. 3C and FIG. 5.

In some implementations, the e-commerce server 102 may also include a management engine 110. The management engine 110 may be configured to interact and communicate with other elements of the system 100, such as one or more applications 126a . . . 126n, the other components of the e-commerce server 102, etc. The management engine 110 may be configured to allow a user (e.g., an office manager) to track, control, access, affect the functionality of, communicate with, intercept data from, etc., one or more applications 126 in an environment where more than one application and/or peripheral may be used (e.g., in a corporate environment where there may be numerous instances of the applications 126 available and operable by numerous client devices 124, and where hundreds of peripherals may be in use, etc.). The management engine 110 is described further herein in reference to at least FIG. 6.

Figure 2:
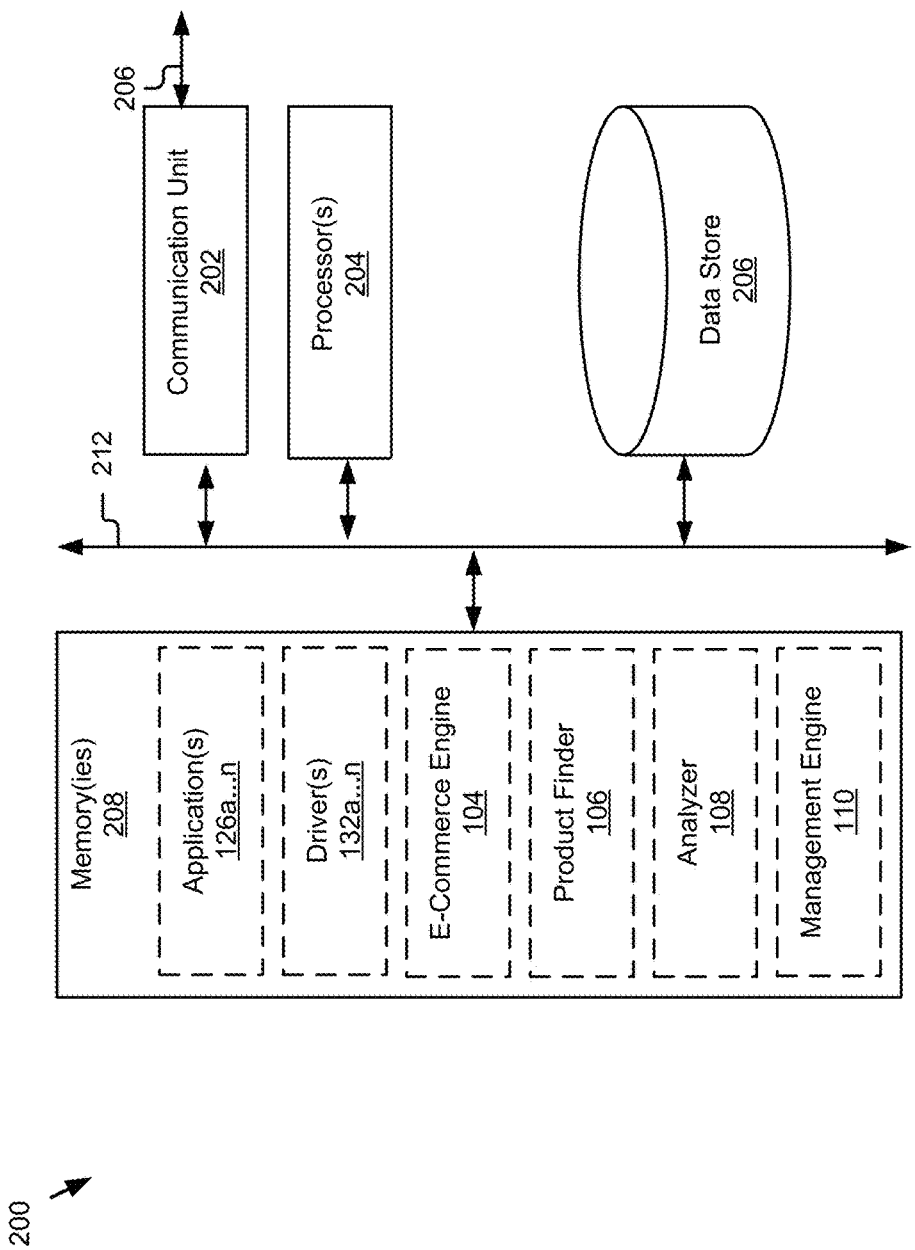
FIG. 2 is a block diagram illustrating an example computing system for automatically determining printer-related items for purchase or suggestion.

FIG. 2 is a block diagram illustrating an example computing system 200, which may be an e-commerce server 102, a client device 124n, or another component of the system 100, depending on the configuration.

As depicted, the computing system 200 may include processor(s) 204, memory(ies) 208, a communication unit 202, a data store 206, which may be communicatively coupled by a communication bus 212. The computing system 200 depicted in FIG. 2 is provided by way of example and it should be understood that they may take other forms and include additional or fewer components without departing from the scope of the present disclosure. For example, while not shown, the computing system 200 may include input and output devices (e.g., keyboard, display, etc.), various operating systems, sensors, additional processors, and other physical configurations.

The processor(s) 204 may execute software instructions by performing various input/output, logical, and/or mathematical operations. The processor(s) 204 may have various computing architectures to process data signals including, for example, a complex instruction set computer (CISC) architecture, a reduced instruction set computer (RISC) architecture, and/or an architecture implementing a combination of instruction sets. The processor(s) 204 may be physical and/or virtual, and may include a single core or plurality of processing units and/or cores. In some implementations, the processor(s) 204 may be capable of generating and providing electronic display signals to a display device (not shown), supporting the display of images, capturing and transmitting images, performing complex tasks including various types of feature extraction and sampling, etc. In some implementations, the processor(s) 204 may be coupled to the memory(ies) 208 via the bus 212 to access data and instructions therefrom and store data therein. The bus 212 may couple the processor(s) 204 to the other components of the computing system 200 including, for example, the memory(ies) 208, the communication unit 202, and the data store 206.

The memory(ies) 208 may store and provide access to data to the other components of the computing system 200. In some implementations, the memory(ies) 208 may store instructions and/or data that may be executed by the processor(s) 204. For example, depending on the computing device 200 configuration, the memory(ies) 208 may store one or more of one or more the application(s) 126, one or more driver(s) 132, the e-commerce engine 104, the product finder 106, the analyzer 108, the management engine 110, and each of their components. The memory(ies) 208 are also capable of storing other instructions and data, including, for example, an operating system, hardware drivers, other software applications, databases, etc. The memory(ies) 208 may be coupled to the bus 212 for communication with the processor(s) 204 and the other components of computing system 200.

The memory(ies) 208 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 204. In some implementations, the memory(ies) 208 may include one or more of volatile memory and non-volatile memory. For example, the memory(ies) 208 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blu-ray™, etc.). It should be understood that the memory(ies) 208 may be a single device or may include multiple types of devices and configurations.

As depicted in FIG. 2, the components 126, 132, 104, 106, 108, and/or 110 may be communicatively coupled by the bus 212 and/or the processor(s) 204 to one another and/or the other components of the system 100. In some implementations, one or more of the components 126, 132, 104, 106, 108, and/or 110 are sets of instructions executable by the processor(s) 204. In some implementations, one or more of the components 126, 132, 104, 106, 108, and/or 110 are stored in the memory(ies) 208. In any of the foregoing implementations, the components 126, 132, 104, 106, 108, and/or 110 may be adapted for cooperation and communication with the processor(s) 204 and other components of the system 100.

The bus 212 can include a communication bus for transferring data between components of a computing device or between computing devices, a network bus system including the network 120 or portions thereof, a processor mesh, a combination thereof, etc. The software communication mechanism can include and/or facilitate, for example, interprocess communication, local function or procedure calls, remote procedure calls, etc.

The communication unit 202 may include one or more interface devices (I/F) for wired and/or wireless connectivity with the network 120 and the other components of the computing system 200. For instance, the communication unit 202 may include, but is not limited to, CAT-type interfaces; wireless transceivers for sending and receiving signals using Wi-Fi™; Bluetooth®, cellular communications, etc.; USB interfaces; various combinations thereof; etc. The communication unit 202 may be coupled to the other components of the enterprise system 110 via the bus 212. The communication unit 202 may be coupled to the network 120 as illustrated by the signal line 206 or directly to any other component of the system 100 by the signal line 206. In some implementations, the communication unit 202 can link the processor(s) 204 to the network 120, which may in turn be coupled to other processing systems. The communication unit 202 can provide other connections to the network 120 and to other entities of the system 100 using various standard communication protocols, including, for example, those discussed elsewhere herein.

The data store 206 may store data for access by other components of the computing system 200 and may be coupled to the computing system 200 by the bus 212. The data store 206 may include any format or architecture. For instance, the data may be stored as tabular data in a DBMS, in a file system as a dataset (e.g., in Excel/XML/.CSV format), or using other known data storage techniques and formats. The data stored by the data store 206 may be organized and queried using various criteria. The data store 206 may include data tables, databases, files, structured objects, and/or other organized collections of data. The data store 206 may be included in the same storage device or system, or disparate storage systems. The DBMS could include a structured query language (SQL) DBMS, a NoSQL DMBS, various combinations thereof, etc. In some instances, the DBMS may store data in multi-dimensional tables comprised of rows and columns, and manipulate (e.g., insert, query, update and/or delete) rows of data using programmatic operations.

Figure 3C:
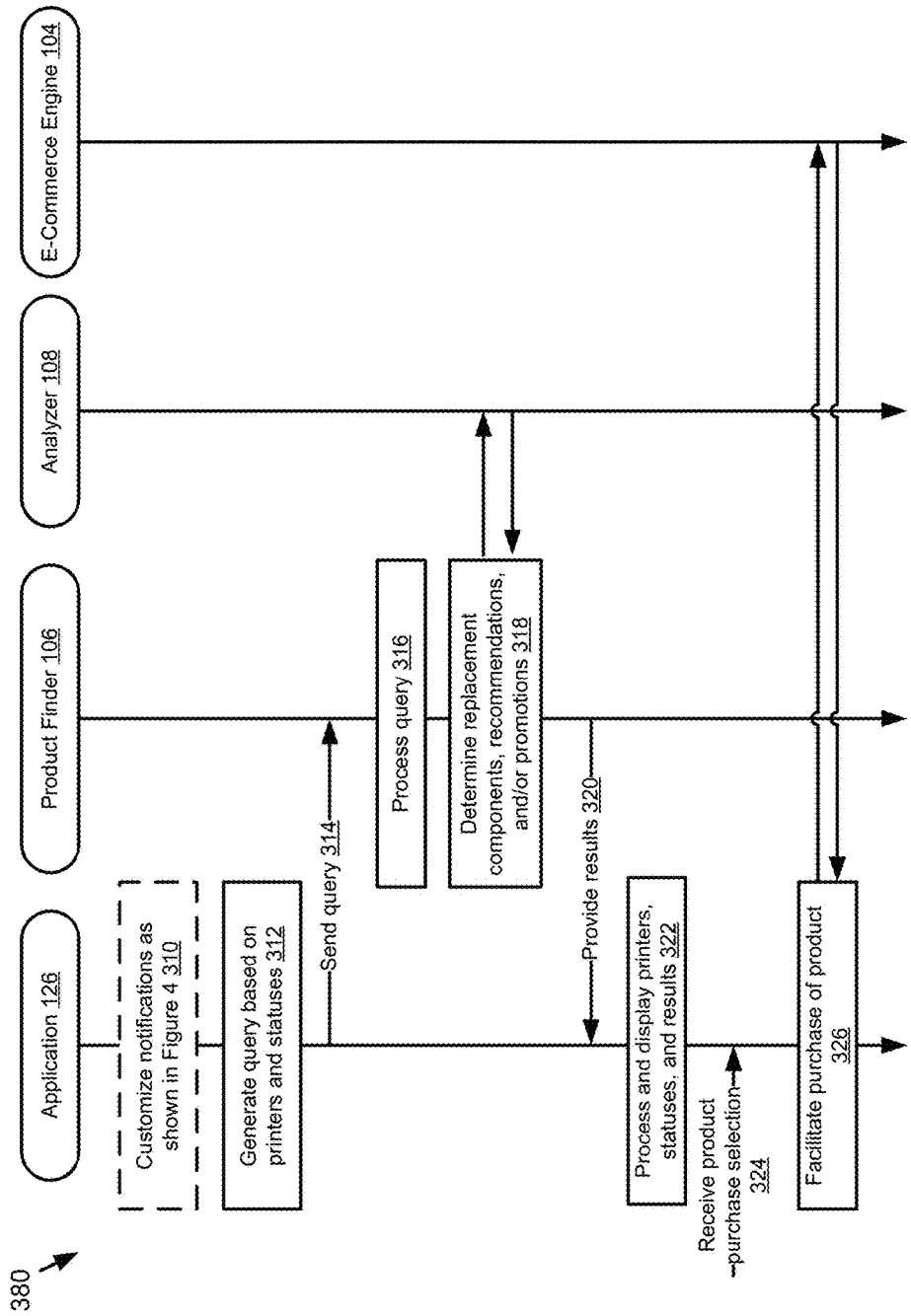

FIGS. 3A, 3B, and 3C are signal diagrams showing example methods 300, 350, and 380 for automatically detecting available peripherals, determining peripheral related items for purchase or suggestion based on the status of those peripherals, and facilitating the purchase of those items using a seamless customer experience. Although these Figures are described in terms of printers, it should be understood that a peripheral could include a printer, a 3d printer, a projector, a laptop, a tablet computer, an input device such as a mouse or a keyboard, or any other suitable device.

Referring to FIGS. 3A and 3B, the application 126 may query 302 printer(s) and printer status by requesting the printer information from one or more printer drivers 132. The application 126 may interact with the printer drivers directly or via a network, such as network 120. In some implementations, the printer drivers may include routines, application programming interfaces (APIs), etc., and the application 126 may use those routines, APIs, etc., to retrieve information about the printers to which the printer drivers correspond. In some implementations, the application 126 may use features (e.g., APIs, routines, etc.) exposed by an operating system of the client devices 124, or a web service, to interact with the printer drivers 132/receive information about the printers.

As a further example, in some implementations, the method 300 may identify one or more peripherals (e.g., printers) associated with the one or more client devices, and may query one or more drivers for one or more dynamic parameters associated with the one or more peripherals. Examples of the dynamic parameters may include, but are not limited to, one or more of an ink level, toner level, level of use, age of the one or more peripherals, and whether the one or more peripherals are operational, etc.

Turning again to FIG. 3A, the printer drivers 132 may provide 304 the printer information to the application 126, and the application 126 may receive, process, and provide the printer information for display to the user (e.g., via a display of the user's client device). In some implementations, the application 126 may process and display 306 printer statuses to a user (e.g., via a display of the user's client device) whereupon the user can select a particular printer or group of printers. After the application 126 receives 308 a printer selection, one or more of the operations of the method 380 depicted in FIG. 3C may be executed.

In some implementations, according to the method 350 as shown in FIG. 3B, the drivers 132 may provide 304 printer information to the application 126, whereupon the application 126 directly generates a query based on the printer information without having displayed information and required a selection of a printer from a user. This allows, in some cases, at least the initial operations of the method 380 depicted in FIG. 3C to be executed without requiring input from the user. As a result, the application may automatically communicate with other components such as the product finder 106, the analyzer 108, or even the e-commerce engine 104 without having first consulted the user.

Figure 7:
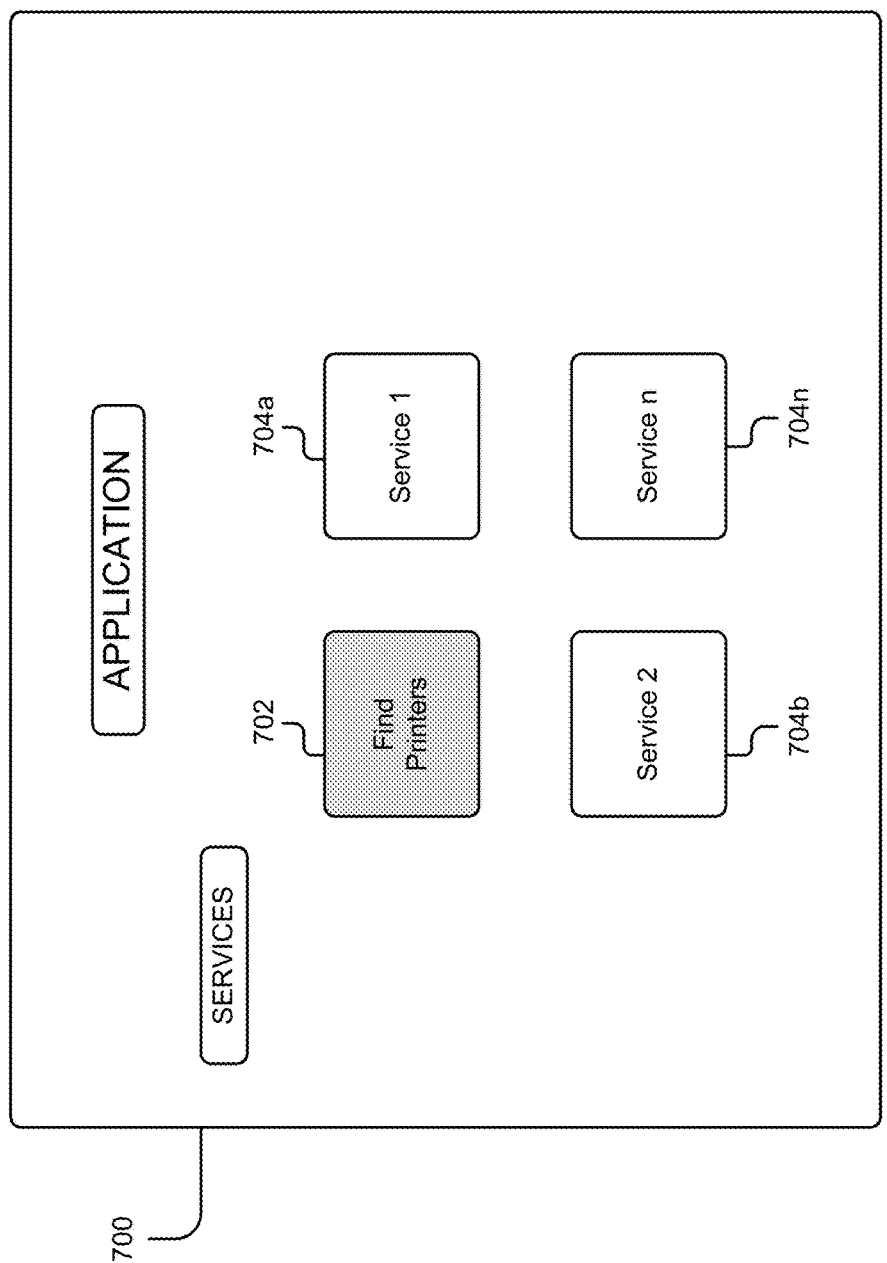
FIG. 7 shows an example graphical user interface providing a user an option to find available printers.
Figure 8:
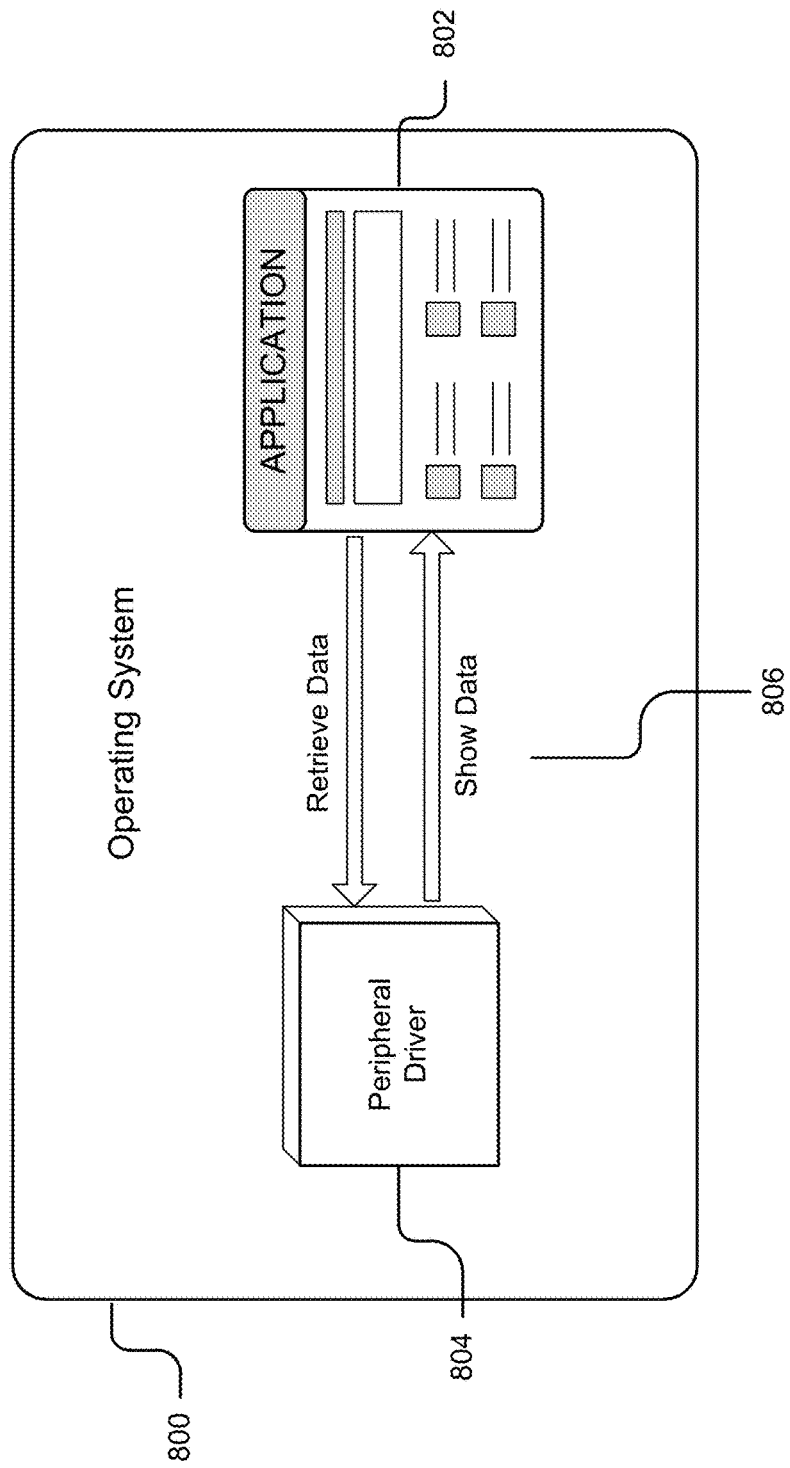
FIG. 8 shows an example graphical user interface indicating to a user that an application is retrieving data from drivers.

FIG. 7 shows an example graphical user interface 700 providing user an option to find available printers. As illustrated in the figure, the graphical user interface 700 may also display other options, such as 704a . . . 704n, to the user. The user may select the "Find Printers" button 702, and in response the application 126 may retrieve data including the printer status(es) from the printer drivers 132 as shown in FIG. 8. FIG. 8 shows an example graphical user interface 800 indicating that the application 126 is communicating with an example driver 132. In some instances, the graphical user interface may show a representation of the application 802, a representation of the driver for a peripheral 804, and a representation indicating that the driver and application are communicating 806.

Figure 9:
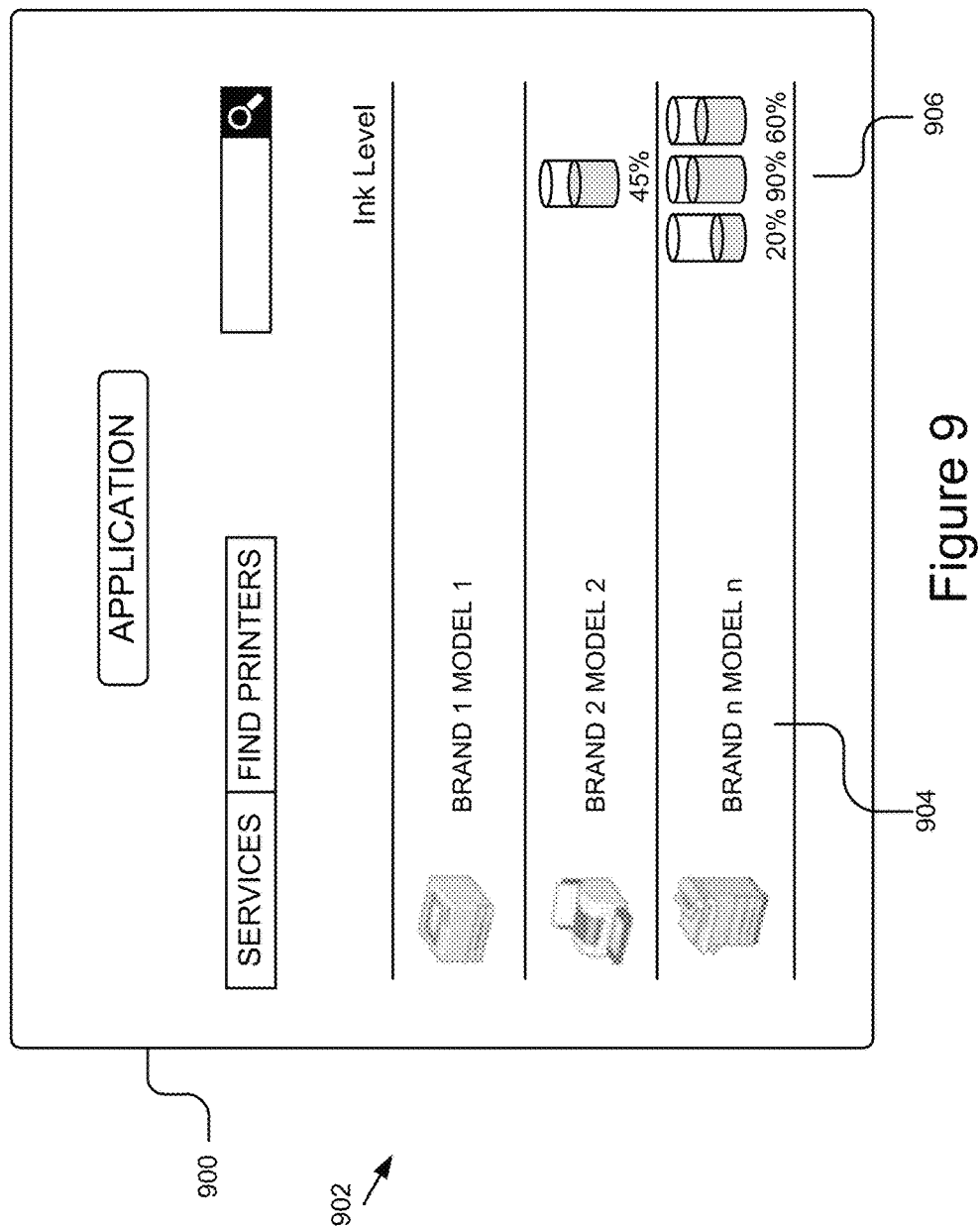
FIG. 9 shows an example graphical user interface displaying to a user a list of printers registered on a client device.

The application 126 may present a summary of the information retrieved from the peripherals to the user as shown in the graphical user interface 900 shown in FIG. 9. For instance, the summary may include printer information with a list of all registered printers 902 on the client device including their make and model 904, their ink/toner levels 906, their level of use (not shown in the figure), whether they are presently operational (not shown in the figure), and any other relevant data. It should be understood that in some implementations the interfaces described herein are applicable to other types of peripherals, and that the corresponding status and/or health of those peripherals may alternatively and/or additionally be depicted.

Returning to the method 300 of FIG. 3A, upon displaying 306 the printer information, the application 126 may receive 308 a printer selection and generate a query based on that selection. In some implementations, the printers may be displayed to the user in a list that includes, among other things, each printer's brand, model, and ink level, and a user may select a printer from the list to generate a product query. For example, as shown in the graphical user interface 1000 in FIG. 10, selecting the printer "Brand 2 Model 2" 1002 populates the search field 1004 with keywords corresponding to the selected printer and the user may then select the search icon 1006 to retrieve items related to that printer such as products, recommendations, coupons, etc. In further example, this query may be automatically performed for each printer (e.g., as the printers and status are received from the printer drivers) so the items related to each printer may be incorporated into the printer summary without the user having to perform an additional queries for those items. In yet another example, the product query may be automatically performed upon selection of a printer from the list without the user having to perform an additional action of selecting a search icon. It should be understood that other variations are contemplated and within the scope of this disclosure.

Figure 4:
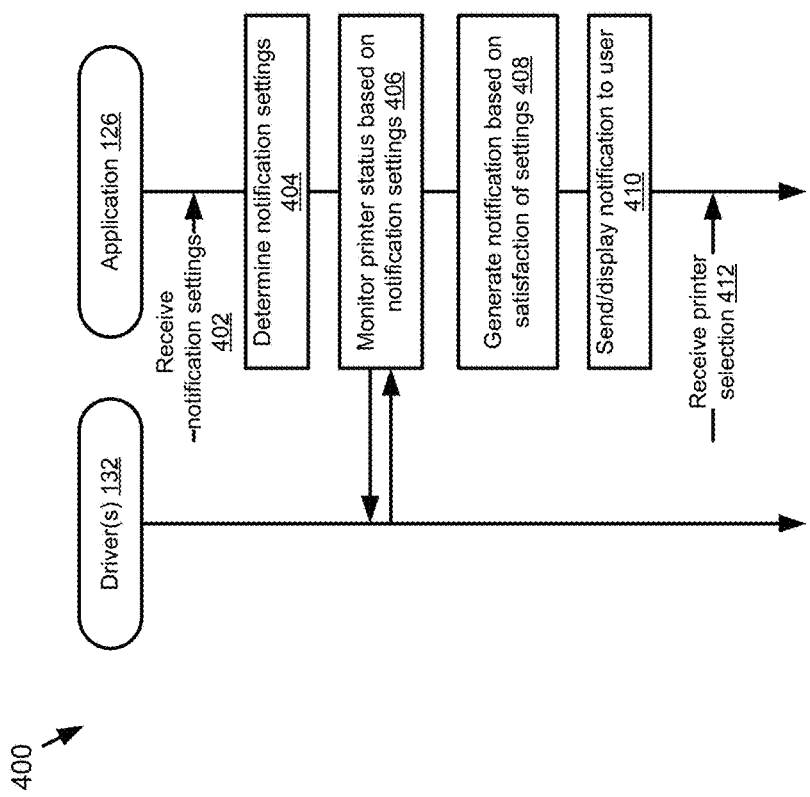
FIG. 4 is a signal diagram illustrating an example method for providing customized notifications.

Returning to the method 380 of FIG. 3C, in some implementations the application 126 may allow the user to customize 310 notifications as further discussed in FIG. 4. The application 126 may generate 312 a query based on the printers and/or statuses and send 314 the query to the produce finder 106. The product finder 106 may receive the query from the application 126 and process 316 it to determine which printer-related items should be provided to the user. In some implementations, the product finder 106 may determine 318 replacement components, recommendations, and/or promotions by requesting and receiving the information from the analyzer 108, as discussed in further detail with reference to at least FIG. 5.

In some implementations, in the results, the method 380 may suggest one or more items associated with a change in one or more dynamic parameters to a user. Suggesting one or more items may include retrieving (e.g., in block 318) user data including one or more of user preference data, purchase history data, organizational data, and customer loyalty data; querying an item database, to find the one or more items, based at least in part on the user data and the identity of the one or more peripherals. The user data may be stored in and retrievable from the data store 206. The method 380 may then send the one or more items for display to the user. Non-limiting examples of the one or more items include one or more of a replacement component, a recommendation of an item related to one of the one or more peripherals, and a promotion.

The product finder 106 may provide 320 the results to the application 126 for processing and display to the user. Upon displaying 322 the results the user, as shown in FIG. 3C, the user may select an item (e.g., product, recommendation, coupon, etc.) and, in response, the application 126 may receive 324 this selection and facilitate 326 the acquisition thereof. Thus, the method 380 may facilitate the purchase of one or more items by the user.

Figure 5:
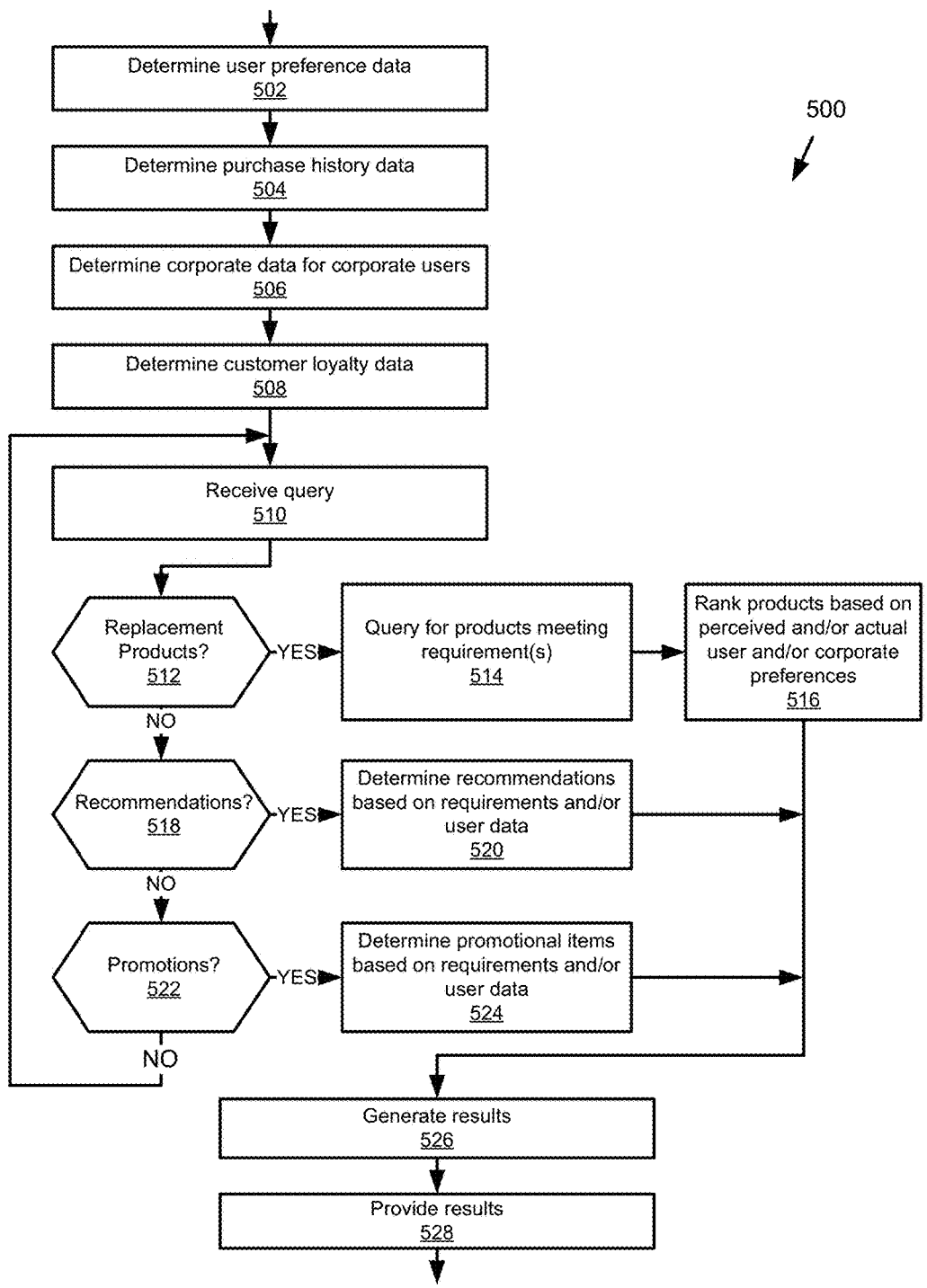
FIG. 5 is a flow diagram of an example method for determining results for a query received from an application.

FIG. 5 is a flow diagram of an example method 500 for determining results for a query received from the application 126. This method 500 may be performed by the product finder 106 in cooperation with other components of the system 100 including, for example, the analyzer 108.

As depicted, the method 500 may determine user data, such as user preference data, purchase history data, corporate data, and/or customer loyalty data in blocks 502, 504, 506, 508. User preference data may include user-defined settings that define the types of items users have a preference for. The purchase history data may include products that users have purchased in the past, including the time and date of those purchases, the number of items purchased, the frequency of those purchases, preferences for certain brands or models, etc. The corporate data may include purchase guidelines and/or requirements for various organizations whose users use the system 100. In some instances, the corporate data may describe which organizations users are associated with (if any), the purchase policies of those organizations (how frequently users may purchase certain products, the amount they may purchase, the brands they may purchase, which brands/products are preferred over others, whether and which users are authorized to purchase on behalf of the organization, etc.). The customer loyalty data may include account numbers, names, home addresses, phone numbers, e-mail addresses, product preferences, etc., for the users of the system 100.

In some implementations, the data in blocks 502, 504, 506, and/or 508 may be determined by retrieving it from an information source, such as the data store 206, or another computing and/or storage device of the system 100. In some implementations, the data may be indexed using a unique identifier associated with a client device, user, department, organization, etc. (e.g., customer number, user ID, etc.), and may be retrieved based thereon.

The method 500 may receive 510 a query from a client device 124 specifying one or more printers and requesting products, recommendations, and/or coupons be provided for those printer(s). In some implementation, the query may include an identifier for a printer, such as a brand and model, and unique ID, etc., and the product finder 106 may query a data store to identify products, recommendations, and/or coupons that are related to the printer and/or the customer using that identifier. In particular, in block 512, product finder 106 may determine whether to search for replacement products for the printer, such as ink or toner cartridges. If so, the product finder 106 may query 514 a product database for items meeting one or more predefined requirements. The requirements may include, without limitation, the printer brand and/or model, a unique identifier for the same, a corporate purchasing policy defining which products can be purchased, etc. The product database may include product data including product identifiers, names, descriptions, manufacturer, specifications, photos, videos, reviews, pricing information, inventory information (discontinued, in-stock, etc.), The products retrieved from the product database by the product finder 106 may then be ranked 516 based on perceived and/or actual user and/or corporate preferences or needs. The analyzer 108 may determine the preferences or needs based on user preference data or other user data determined in blocks 502, 504, 506, and/or 508. For example, the analyzer 108 may analyze the user's purchase history data to determine which items (e.g., printer cartridges) the user has an affinity for and the product finder 106 may move those items to the top of the result set so they appear first when displayed to the user. As a further example, from the user's purchase history, the analyzer 108 may determine that the user routinely purchases off-label cartridges for the printer being queried, and the product finder 106 may sort the results to place those cartridges first in the result set. In another example, a company, manager, administrator, etc., may place preferences on certain products that it would prefer its employees use, and the analyzer 108 may analyze that company's corporate data to determine these preferences when ranking the products to be included in the result set by the product finder 106. For instance, the analyzer 108 may analyze the corporate data to determine which brands (e.g., a premium brand, an off label brand, etc.) of printer cartridges it would prefer its employees purchase and may rank those cartridges higher than other compatible cartridges.

In block 518, the product finder 106 may determine whether recommendations should be included in the result set, and if so, may determine 520 the recommendations. These recommendations may be determined based on one or more requirements, such as the brand and/or model of printer being queried, although the recommendations are not limited to such and may be based on other criteria, such as attributes determined by the analyzer 108 in its analysis of the user's data. Non-limiting examples of recommendations may include paper for the printer, office supplies, other replacement components (e.g., printer nozzles, etc.), etc. For example, the analyzer 108 may determine from the age and use of the printer, which may be provided in the query received in block 510, that the printer may be reaching the end of its usable life and, based on this analysis, the product finder 106 may identify one or more replacement printers for suggestion to the user. These suggestions may be based on the user's own product preferences, from perceived preferences derived from the user's purchase history, such as brands that the user has shown an affinity for by routinely purchasing those products in the past, from pre-selected preferences (e.g., as mandated by a supervising user), etc.

In block 522, the product finder 106 may determine whether to provide any promotional items, such as coupons for products related to the user and/or the printer included in the query. These promotional items may be based on one or more requirements, such as the brand and/or model of printer being queried, although the promotional items are not limited to such and may be based on other criteria, such as attributes derived by the analyzer 108 in its analysis of the user's data, as discussed above, or unrelated data such as advertisement data. Once the replacement products, recommendations, and promotions have been determined 524, the product finder 106 may generate 526 a result set containing these items and provide 528 the result set to the client device 124 for processing and display. In some implementations, the result set may be ranked, as discussed previously.

Figure 6:
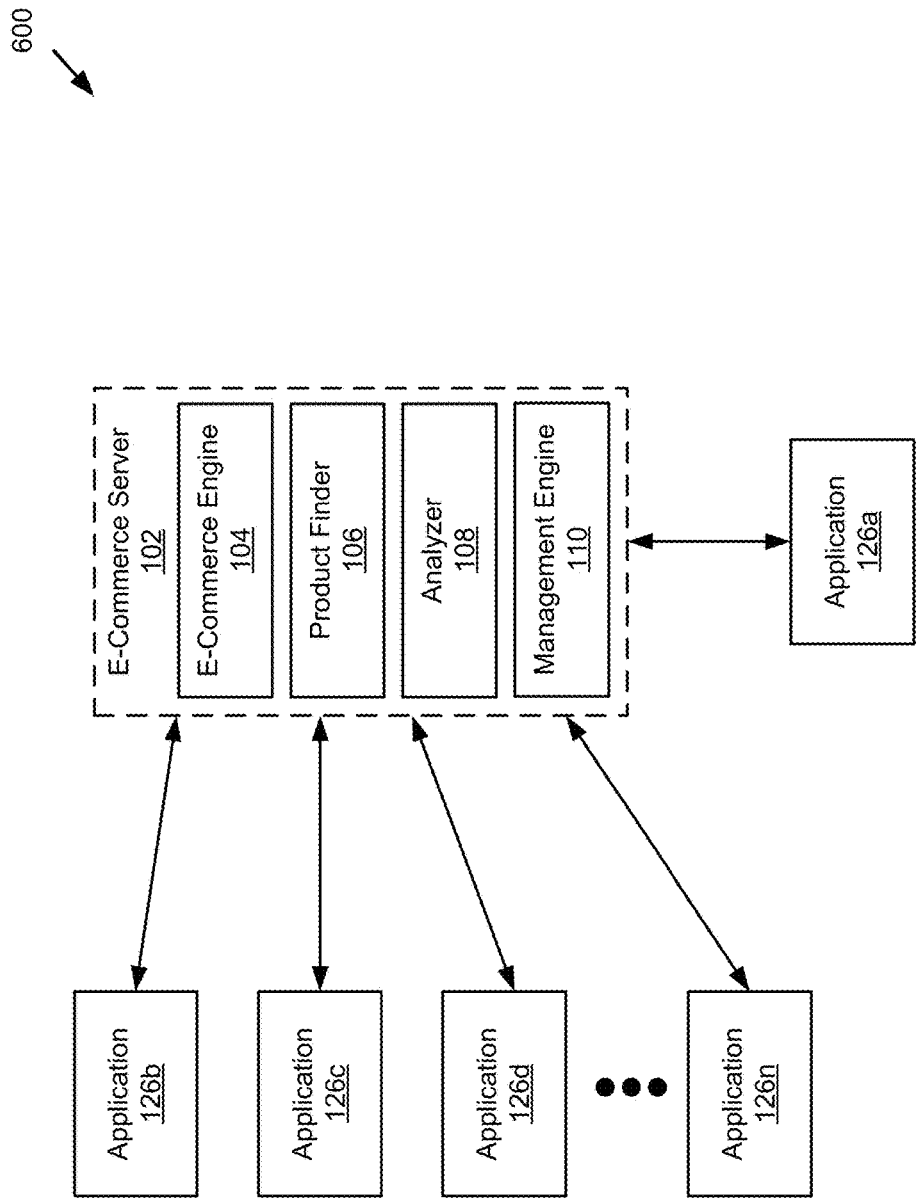
FIG. 6 is a data flow diagram showing an example method for management of peripheral-related items.

In some implementations, as described in further detail in reference to FIG. 6, the application 126 may communicate with the management engine 110 to request approval to facilitate the acquisition of an item; and in some implementations the application may communicate with the management engine 110 to queue the purchase of the product by a particular user (e.g., an office manager, facilities manager, or individual in a corporate environment, etc.).

As a further example, in some implementations, the management engine 110 may restrict the sending of one or more items (e.g., products) to the user based on organizational data that reflects organizational preferences. Organizational preferences may include preferred quantities, types of items, administrative approval processes, order timelines, delivery timelines, brands of peripherals or components, price ranges, etc. The management engine 110 may also require approval by one or more administrators of an organization and facilitate acquisition of the one or more items by a user.

In some implementations, the management engine 110 may track the identity of one or more peripherals and one or more items and provide information linking the identity of the one or more peripherals and the one or more items to one or more administrators, as discussed in further detail elsewhere herein. Other variations are also possible and contemplated.

Figure 10:
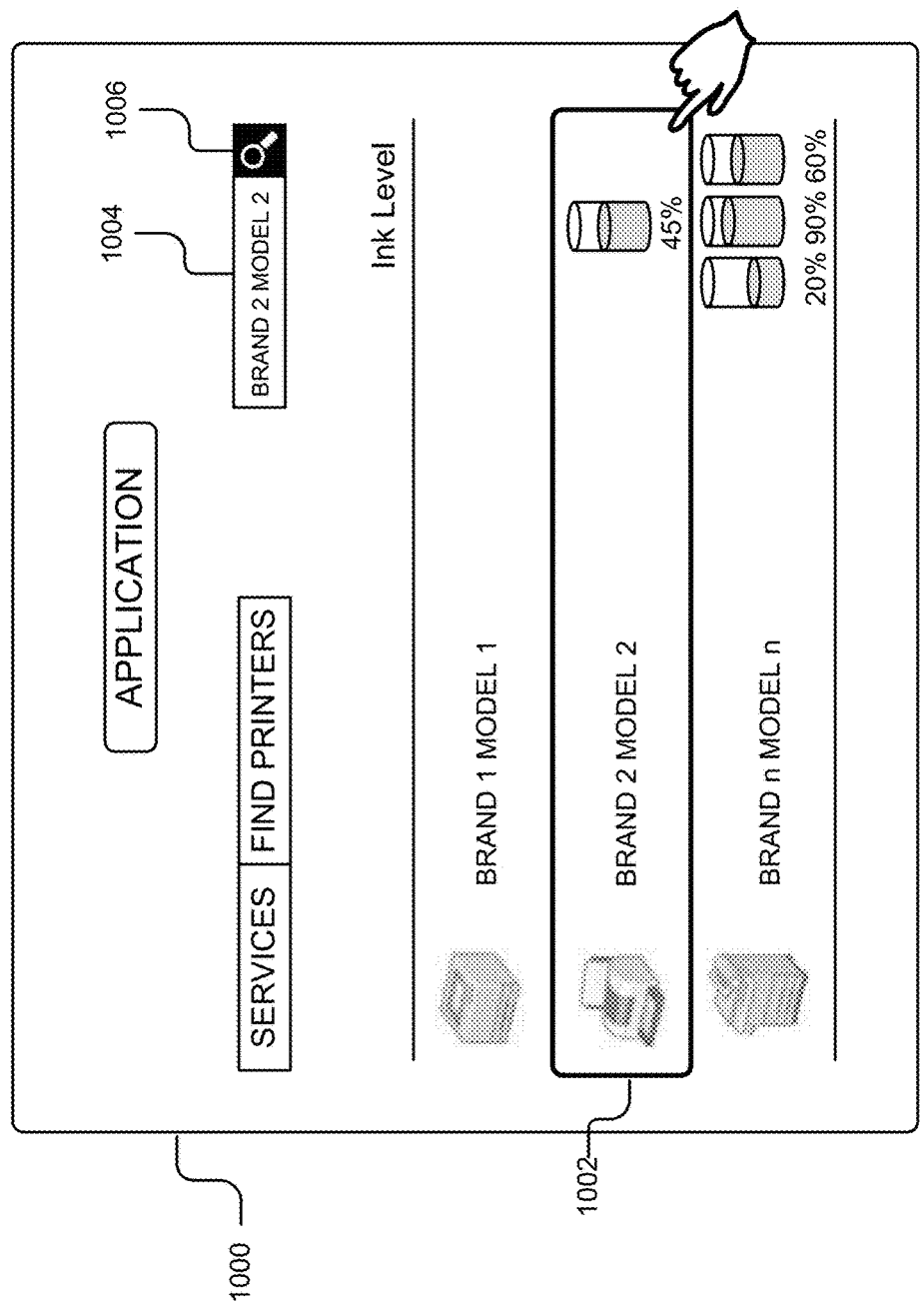
FIG. 10 shows an example graphical user interface allowing a user to select a printer from a list.
Figure 11:
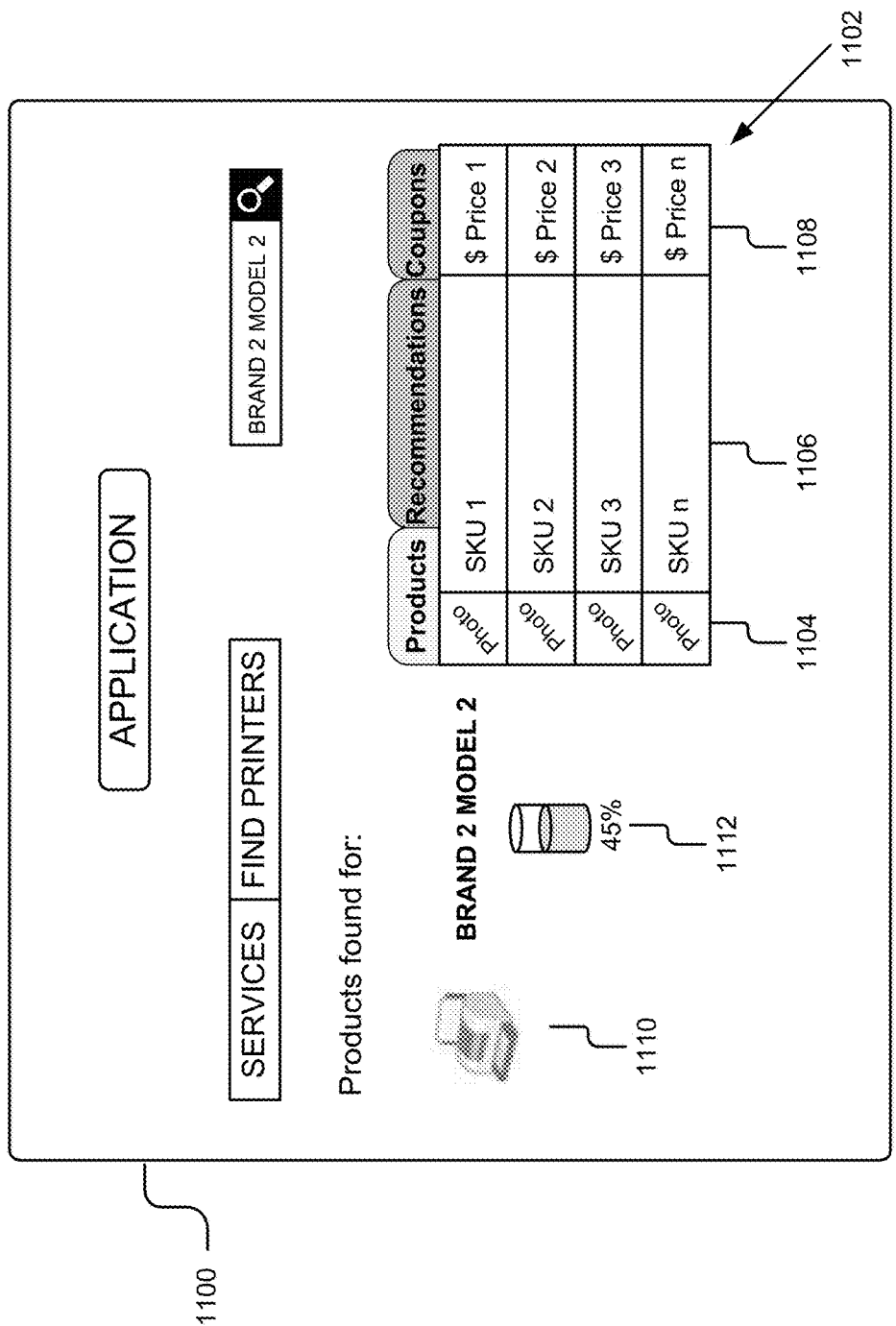
FIG. 11 shows an example graphical user interface displaying cartridges for a printer selected in FIG. 10.

By way of further example, FIG. 11 shows an example graphical user interface 1100 displaying printer cartridges 1102 for the printer selected in FIG. 10. The graphical user interface 1100 may also include photographs 1104, product numbers 1106, and prices 1108 of the suggested printer cartridges. In some implementations the graphical user interface 1100 may also include a depiction of the selected printer 1110 and/or the ink level 1112 of the selected printer. The user may select one or more of these items for purchase and the application 126 may facilitate a seamless purchase experience for purchasing these item(s). For example, the application 126 may interact with the e-commerce engine 104 to complete the purchase of these items. In some instances, the application 126 may redirect the user to a website provided by the e-commerce engine 104, may provide for completion of the purchase directly (e.g., and interact with the ecommerce engine 104 via APIs, etc., for the user to complete the purchase of the selected items, although other implementations are also possible and contemplated.

Figure 12:
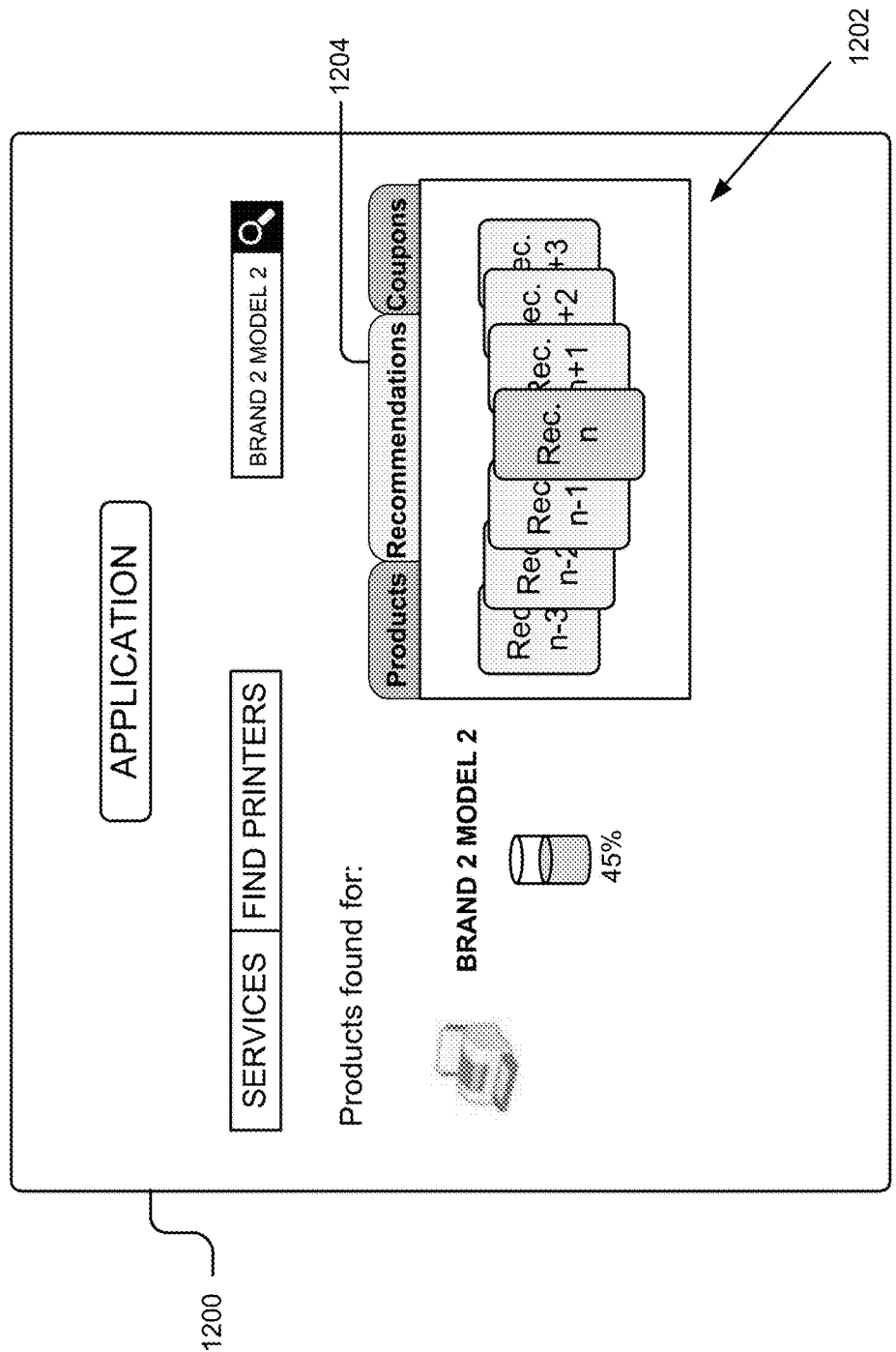
FIG. 12 shows an example graphical user interface displaying recommendations for a printer selected in FIG. 10.
Figure 13:
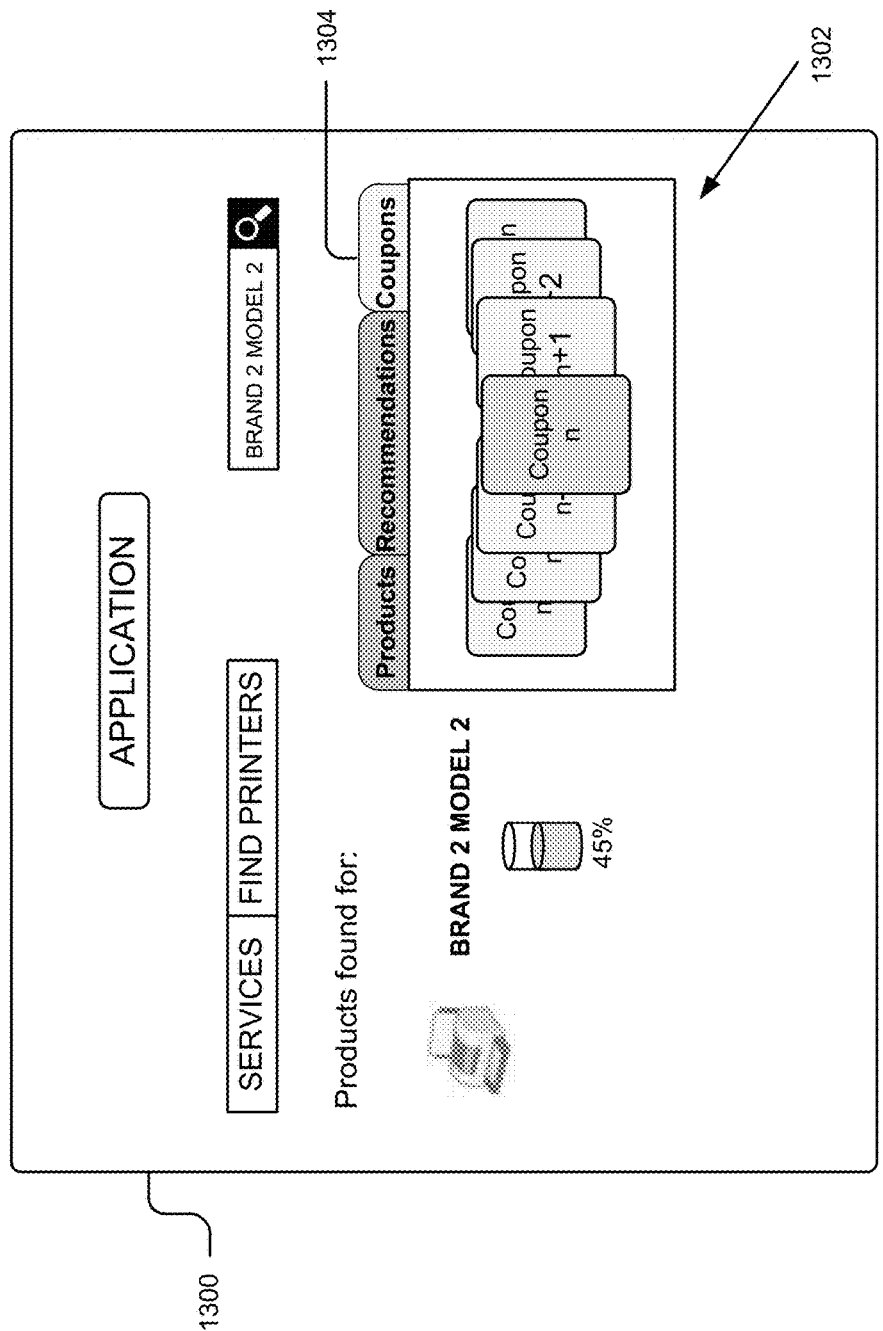
FIG. 13 shows an example graphical user interface displaying relevant coupons for a printer selected in FIG. 10.

FIG. 12 shows an example graphical user interface 1200 containing recommendations 1202 of products for user to purchase, and FIG. 13 shows an example graphical user interface 1300 containing relevant coupons 1302 for products for the user to utilize. The user may select one or more recommendations 1202 and/or coupons 1302 and the application 126 may facilitate the purchase of the recommended and/or promotional items as discussed above with reference to FIG. 11. As depicted in FIGS. 12 and 13, the recommendations 1202 may be presented in a carousel style format, but it should be understood that they may be displayed using other formats such as a grid, a list, etc. FIG. 12 shows a recommendations tab 1204 being selected and FIG. 13 shows a coupons tab 1304 being selected, but it should be understood that other forms or organizations would be possible and are contemplated herein.

In some implementations, a user may customize the system 100 to notify the user when certain printer-related thresholds have been met so the user may easily take appropriate action. FIG. 4 is a signal diagram showing an example method 400 for providing customized notifications. In this figure, the application 126 may receive 402 one or more notification settings from a user. In some implementations, the notification settings may be based on the personal preferences, may be driven by the needs of a corporate entity that the user is affiliated with (e.g., an employee of), may be based on a combination of the foregoing, and/or other criteria.

By way of example, the user may define a notification setting based on a custom ink or toner level of the cartridges of the printers installed on his/her client device 124. For instance, the user may wish to receive advanced notice of when various cartridges may be running low on ink or toner so he/she may reorder those cartridges before they run out of ink or toner completely. In some implementations, the application 126 may monitor how much ink/toner the user goes through over a predetermined period, may use this information to forecast the time and date that the user may run out of ink/toner, and may provide this forecast to the user so the user may use it when customizing the notification thresholds. In other cases, the application 126 may automatically adjust the notification thresholds based on the user's historical ink/toner use. Further non-limiting example thresholds include one or more of a user customized threshold and a threshold automatically determined by the system based on prior usage.

In another example, the user may be a facilities manager and may be responsible for servicing the printers used by the employees. The facilities manager can set notification thresholds based on the state of the printer, the stock of the printer-related items on hand, etc., and the application 126 may send/display the notifications to the manger so the manger can reorder any supplies before they are actually needed to avoid any printer outages due to supply issues. This use-case may also be applied to a supervisor where the supervisor must provide approval for any purchases being requested by his/her employees. Other variations are also possible. In these examples, the settings may establish who the stakeholders in the organization are so the notifications can be routed by system 100 to the proper stakeholders so as not to disturb users that would otherwise be unable to reorder supplies.

Figure 14A:
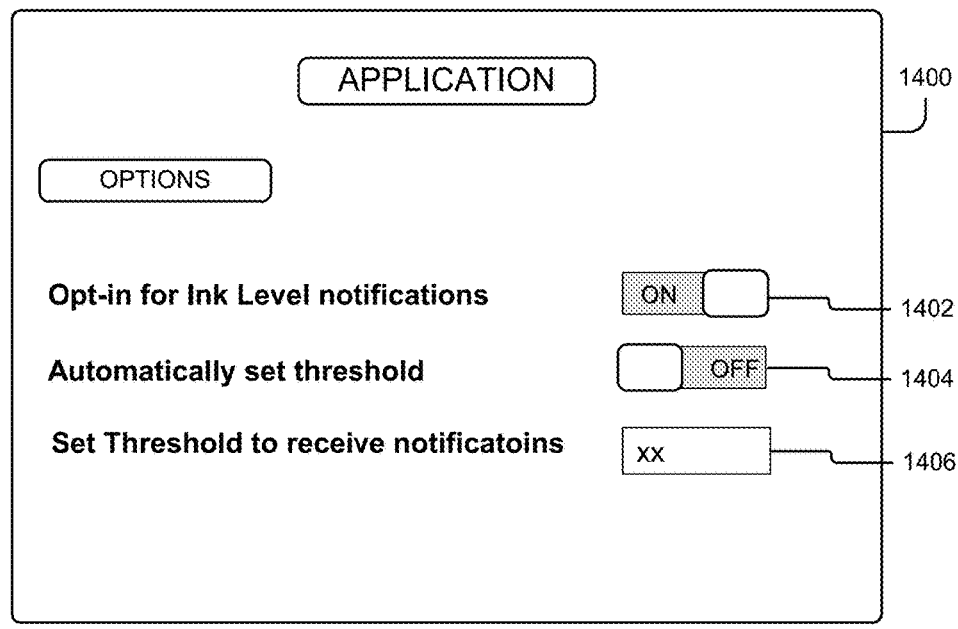
FIG. 14A shows an example graphical user interface providing options to customize notifications based a threshold ink level.

FIG. 14A shows an example graphical user interface 1400 providing options to customize notifications based on a threshold ink level. As depicted, the graphical user interface 1400 provides the user an opportunity to opt-in for ink level notifications 1402. In some implementations the application 126 may, as already described above, have the capability to automatically monitor ink levels and set thresholds; the graphical user interface 1400 may allow a user to select whether or not to automatically set the threshold 1404. The graphical user interface may also allow a user to select the threshold at which a notification is presented to the user 1406. As depicted, the threshold is a percentage of the ink level, however it should be understood that other implementations are possible. For example, a threshold may be the age of a peripheral, remaining life of a projector bulb, battery life, paper quantity, etc., as discussed elsewhere herein.

Returning to FIG. 4, upon receiving 402 the one or more notification settings and/or determining 404 the notification settings 404 (e.g., based on the notification settings input received), the application 126 may monitor the status of the printers 406 and compare the printer statuses to the notification settings to determine if they have been met. In some implementations, the method 400 may monitor one or more dynamic parameters associated with the peripherals. For instance the method 400 may track by tracking past usage of one or more peripherals and using the tracked past usage to select the threshold level.

If the application 126 determines that the notification settings have been met in block 408, the application 126 may generate a notification based on the satisfaction of the notification settings and may send/display 410 the notification to the user. To generate a notification, in some implementations, the method 400 may monitor one or more dynamic parameters, compare the one or more dynamic parameters to one or more thresholds, and notify a user when the one or more dynamic parameters corresponds to the one or more thresholds, as discussed elsewhere herein.

Figure 14B:
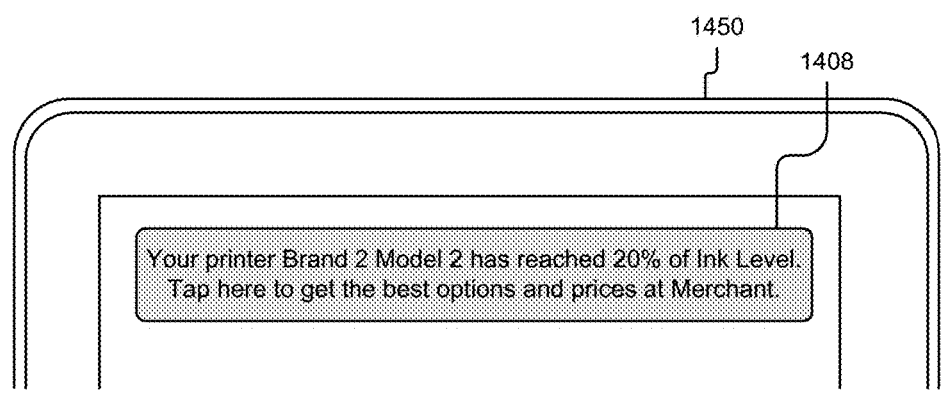
FIG. 14B shows an example graphical user interface displaying a notification indicating a low ink level for a particular printer.

Examples of a notification may include, but are not limited to, pop-up notifications, email notifications, text messages, etc. The notification may include a printer summary, such as one similar to the summary discussed above with reference to FIG. 9 and/or may include an electronic link (e.g., a URL) directing the user to such a summary. In some implementations, the application 126 may then receive a printer selection 412 from the user. An example graphical user interface 1450 displaying a notification 1408 indicating a low ink level for a particular printer is shown in FIG. 14B. As shown, the notification 1408 may include a link directing the user to a summary, as discussed above. Using the printer summary, the user may proceed to conveniently query for and order printer-related items, as discussed above.

FIG. 6 is a data flow diagram showing an example method 600 for management of peripheral-related items. In some implementations the system 100 may be configured to allow management of multiple instances of the application 126b . . . 126n by a company or a facilities manager. The method 600 allows communication from the applications 126a . . . 126n running on client devices 124a . . . 124n with the e-commerce server 102. In some implementations, as depicted in FIG. 6, the e-commerce server 102 may include a management engine 110. The management engine 110 may be configured to communicate with one or more applications 126a . . . 126n and/or may be other components of the e-commerce server 102. The management engine 110 may be configured to allow a user (e.g., a facilities manager, an office manager, etc.) to track, control, access, affect the functionality of, communicate with, intercept data from, monitor, manage, etc. one or more applications 126a . . . 126n in an environment where more than one application and/or peripheral may be used.

In some implementations, the management engine 110 may be configured to allow corporate-side tracking of peripherals, peripheral related items, consumable usage, and/or orders, etc. For example, each of the applications 126a . . . 126n may be connected to one or more printers and may monitor the toner levels in each of the printers. The management engine 110 may track the identity of each of the applications 126a . . . 126n and associate the applications, user devices, and/or peripherals with a particular business entity. The management engine 110 may aggregate information about the statuses of each of the printers and allow corporate-side tracking of data regarding toner usage and levels. The management engine 110 may store and/or retrieve data describing the information being aggregated in an information source, such as the data store 206. In some implementations, the management engine 110 may require approval by an administrator in order to allow a new toner cartridge to be ordered using an application 126a . . . 126n. In some implementations, an application 126a may be responsible for managing other applications 126b . . . 126n in a multiuser or corporate environment.

In some implementations, the management engine 110 may be configured to require administrative approval of all orders or of information exchanged between an application 126a . . . 126n and the components of the e-commerce server 102, such as the analyzer 108, the product finder 106, etc. In some implementations, certain items may be pre-approved, so the management engine 110 may permit a user to order an item without obtaining approval from an administrator. For example, in a corporate environment, a user may not be able to order a toner cartridge, which costs over $100 without approval by an administrator within the corporation; in such instances, the management engine 110 may provide an approval request or a group of approval requests to the administrator, receive corresponding approval responses thereto, and regulate the purchasing by users based thereon. Data reflecting the approval process may be stored and/or manipulated in the data store 206.

The management engine 110 may allow a user to queue orders, set preferences defining corporate preferences or corporate data, track orders and usage, manage billing, fulfillment, and/or distribution of orders, etc. In some implementations, the management engine 110 may queue orders or may allow orders to be queued in a multi-user or multi-application environment. For example, multiple applications 126b . . . 126n may each request purchase of various ink cartridges, new printers, or other peripheral related items from the e-commerce server 102. The management engine 110 may allow multiple items to be queued together, so that they can be ordered and/or paid for as a group.

In some implementations, the management engine 110, may allow management of applications 126b . . . 126n and associated peripherals and orders by another application 126a. For example, a supervisory user (e.g., a facilities manager or office manager) may use an application 126a to track printers, toner levels, or other statuses in a situation where there are multiple applications 126b . . . 126n associated with multiple peripherals. For example, users associated with applications 126b and 126d may request replacement cartridges for their printers, and the management engine 110 may queue those requests for bulk approval by an administrator user interacting with application 126a. The administrator user may use the application 126a to approve and/or deny the requests at once, or may elect to approve some while denying others. Approval and denial responses may be transmitted to the management engine 110, and the management engine 110 may allow and/or deny purchase of those items via the e-commerce engine 104 accordingly.

In some implementations, the management engine 110, in conjunction with one or more of the applications 126a . . . 126n, may track which of the items are associated with which of the peripherals, so that a user (e.g., a facilities manager) may know which of the items in a shipment belongs with a particular peripheral, and use that information to service the peripherals using the ordered components.

While many implementations and examples of the technology discussed herein are described within the context of printers, it should be understood that these implementations and examples are non-limiting and applicable to other similar products and/or services. In the above description, for purposes of explanation, numerous specific details are set forth in order to provide a thorough understanding of this disclosure. It should be understood, however, that the systems, methods, and computer products described herein can be practiced without these specific details. In other instances, structures and devices are shown in block diagram form in order to avoid obscuring the disclosure. For example, the various components, operations, and/or features are described in some implementations above with reference to user interfaces and particular hardware. However, the present disclosure applies to any type of computing device that can receive data and commands, and any peripheral devices providing services.

Reference in the disclosure to "one implementation," "an implementation," "some implementations," etc., means that a particular feature, structure, or characteristic described in connection with the implementation is included in at least one implementation. The appearances of the phrase "in one implementation" or "in some implementations" in various places in the disclosure are not necessarily all referring to the same implementation(s).

Some portions of the detailed descriptions above are presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "defining" or "identifying" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, for example, any type of disk including floppy disks, optical disks, CD-ROMs, and magnetic disks, read-only memories (ROMs), random access memories (RAMs), EPROMs, EEPROMs, magnetic or optical cards, cloud storage, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment.

What is claimed is:

1. A computer implemented method comprising:
identifying, using a first application operable on one or more computing devices, one or more peripherals associated with one or more client devices, the one or more client devices associated with an organization, the organization having a plurality of users;
querying, by the first application, one or more drivers for one or more dynamic parameters associated with the one or more peripherals;
generating, by the first application, a graphical user interface including:
a first graphical element representing a first peripheral of the one or more peripherals, the first peripheral being a first type of peripheral, the first graphical element being selectable to populate a search field of the graphical user interface with a keyword associated with the first peripheral,
a second graphical element representing a status of a first dynamic parameter associated with the first peripheral,
a third graphical element representing a second peripheral of the one or more peripherals, the second peripheral being a second type of peripheral, the second type of peripheral being different than the first type of peripheral, and
a fourth graphical element representing a status of a second dynamic parameter associated with the second peripheral;
populating the search field of the graphical user interface with the keyword associated with the first peripheral based on receiving input indicating a selection of the first graphical element;
analyzing organizational data of the organization to determine one or more items using the one or more dynamic parameters, the organizational data including organizational preferences and approval criteria for acquiring items for the one or more peripherals, the approval criteria indicating at least one of the one or more items being pre-approved by a first user to be purchased by a second user;
ranking the one or more items based on an identification of the second user and the organizational data including the approval criteria for acquiring items;
suggesting, by the first application, one or more items associated with a change in the one or more dynamic parameters to the second user of the plurality of users based on the ranking of the one or more items;
transmitting, via a computer network from the first application to a management engine, usage data reflecting the one or more dynamic parameters and order data reflecting an order placed using the first application; and
tracking, via the management engine, peripheral usage and orders across a plurality of applications including the first application based on the usage data and the order data, the plurality of applications being associated with one or more additional peripherals.

2. The method of claim 1, further comprising facilitating a purchase of the one or more items by the second user.

3. The method of claim 1, further comprising:
monitoring the one or more dynamic parameters;
comparing the one or more dynamic parameters to one or more thresholds; and
notifying the second user when the one or more dynamic parameters corresponds to the one or more thresholds.

4. The method of claim 3, wherein the one or more thresholds includes one or more of a user customized threshold and a threshold automatically determined based on prior usage.

5. The method of claim 3, wherein the one or more peripherals includes a plurality of printers of different types.

6. The method of claim 3, wherein the one or more peripherals includes a plurality of peripherals requiring different components.

7. The method of claim 5, wherein the one or more dynamic parameters comprises one or more of ink level, toner level, level of use, age of the one or more peripherals, and whether the one or more peripherals are operational.

8. The method of claim 3, wherein monitoring the one or more dynamic parameters further comprises tracking past usage of the one or more peripherals and using the tracked past usage to select a threshold level.

9. The method of claim 1, wherein suggesting the one or more items further comprises:
retrieving user data including one or more of user preference data, purchase history data, the organizational data, and customer loyalty data;
querying an item database, to find the one or more items, based at least in part on the user data and an identity of the one or more peripherals; and
sending the one or more items for display to the second user.

10. The method of claim 9, wherein the one or more items includes one or more of a replacement component, a recommendation of an item related to one of the one or more peripherals, and a promotion.

11. The method of claim 9, further comprising restricting the sending of the one or more items to the second user based on the organizational data that reflects the organizational preferences.

12. The method of claim 10, further comprising requiring an approval by one or more administrators of the organization and facilitating acquisition of the one or more items by the second user.

13. The method of claim 12, further comprising tracking the identity of the one or more peripherals and the one or more items and providing information linking the identity of the one or more peripherals and the one or more items to the one or more administrators.

14. The method of claim 12, further comprising receiving an order request and queuing the order request until the approval by the one or more administrators.

15. A system comprising:
one or more processors; and
one or more memories storing instructions that, when executed by the one or more processors, cause the system to:
identify, using a first application, one or more peripherals associated with one or more client devices, the one or more client devices associated with an organization, the organization having a plurality of users;
query, by the first application, one or more drivers for one or more dynamic parameters associated with the one or more peripherals;
generate, by the first application, a graphical user interface including:
a first graphical element representing a first peripheral of the one or more peripherals, the first peripheral being a first type of peripheral, the first graphical element being selectable to populate a search field of the graphical user interface with a keyword associated with the first peripheral,
a second graphical element representing a status of a first dynamic parameter associated with the first peripheral,
a third graphical element representing a second peripheral of the one or more peripherals, the second peripheral being a second type of peripheral, the second type of peripheral being different than the first type of peripheral, and
a fourth graphical element representing a status of a second dynamic parameter associated with the second peripheral;
populate the search field of the graphical user interface with the keyword associated with the first peripheral based on receiving input indicating a selection of the first graphical element;
analyze organizational data of the organization to determine one or more items using the one or more dynamic parameters, the organizational data including organizational preferences and approval criteria for acquiring items for the one or more peripherals, the approval criteria indicating at least one of the one or more items being pre-approved by a first user to be purchased by a second user;
rank the one or more items based on an identification of the second user and the organizational data including the approval criteria for acquiring items; and
suggest, by the first application, one or more items associated with a change in the one or more dynamic parameters to the second user of the plurality of users based on the ranking of the one or more items.

16. The system of claim 15, wherein the instructions, when executed by the one or more processors further cause the system to facilitate a purchase of the one or more items by the second user.

17. The system of claim 15, wherein the instructions, when executed by the one or more processors further cause the system to
monitor the one or more dynamic parameters;
compare the one or more dynamic parameters to one or more thresholds; and
notify the second user when the one or more dynamic parameters corresponds to the one or more thresholds.

18. The system of claim 17, wherein the one or more thresholds includes one or more of a user customized threshold and a threshold automatically determined by the system based on prior usage.

19. The system of claim 17, wherein the one or more peripherals includes a plurality of printers of different types.

20. The system of claim 17, wherein the one or more peripherals includes a plurality of peripherals requiring different components.

21. The system of claim 19, wherein the one or more dynamic parameters comprises one or more of ink level, toner level, level of use, age of the one or more peripherals, and whether the one or more peripherals are operational.

22. The system of claim 17, wherein to monitor the one or more dynamic parameters further comprises tracking past usage of the one or more peripherals and using the tracked past usage to select a threshold level.

23. The system of claim 15, wherein to suggest the one or more items further comprises:
retrieving user data including one or more of user preference data, purchase history data, the organizational data, and customer loyalty data;
querying an item database, to find the one or more items, based at least in part on the user data and an identity of the one or more peripherals; and
sending the one or more items for display to the second user.

24. The system of claim 23, wherein the one or more items includes one or more of a replacement component, a recommendation of an item related to one of the one or more peripherals, and a promotion.

25. The system of claim 23, wherein the instructions, when executed by the one or more processors, further cause the system to restrict the sending of the one or more items to the second user based on the organizational data that reflects the organizational preferences.

26. The system of claim 25, wherein the instructions, when executed by the one or more processors, further cause the system to require an approval by one or more administrators of the organization and facilitating acquisition of the one or more items by the second user.

27. The system of claim 26, wherein the instructions, when executed by the one or more processors, further cause the system to track the identity of the one or more peripherals and the one or more items and provide information linking the identity of the one or more peripherals and the one or more items to the one or more administrators.

28. The system of claim 26, wherein the instructions, when executed by the one or more processors, further cause the system to receive an order request and queuing the order request until the approval by the one or more administrators.

29. A computer program product comprising a non-transitory computer-usable medium including instructions which, when executed by a computer, cause the computer to:
    identify using a first application, one or more peripherals associated with one or more client devices, the one or more client devices associated with an organization, the organization having a plurality of users;
    query, by the first application, one or more drivers for one or more dynamic parameters associated with the one or more peripherals;
    generate, by the first application, a graphical user interface including:
        a first graphical element representing a first peripheral of the one or more peripherals, the first peripheral being a first brand of peripheral, the first graphical element being selectable to populate a search field of the graphical user interface with a keyword associated with the first peripheral;
        a second graphical element representing a status of a first dynamic parameter associated with the first peripheral,
        a third graphical element representing a second peripheral of the one or more peripherals, the second peripheral being a second brand of peripheral, the second brand of peripheral being different than the first brand of peripheral, the third graphical element being selectable to populate the search field of the graphical user interface with a keyword associated with the second peripheral, and
        a fourth graphical element representing a status of a second dynamic parameter associated with the second peripheral;
    populate the search field of the graphical user interface with the keyword associated with the first peripheral based on receiving input indicating a selection of the first graphical element;
    analyze organizational data of the organization to determine one or more items using the one or more dynamic parameters, the organizational data including organizational preferences and approval criteria for acquiring items for the one or more peripherals, the approval criteria indicating at least one of the one or more items being pre-approved by a first user to be purchased by a second user;
    rank the one or more items based on an identification of the second user and the organizational data including the approval criteria for acquiring items;
    suggest by the first application, one or more items associated with a change in the one or more dynamic parameters to the second user of the plurality of users based on the ranking of the one or more items;
    transmit, via a computer network from the first application to a management engine, usage data reflecting the one or more dynamic parameters and order data reflecting an order placed using the first application; and
    track, via the management engine, peripheral usage and orders across a plurality of applications including the first application based on the usage data and the order data, the plurality of applications being associated with one or more additional peripherals.

30. The computer program product of claim 29, wherein the instructions, when executed by the computer further cause the computer to facilitate a purchase of the one or more items by the second user.

31. The computer program product of claim 29, wherein the instructions, when executed by the computer further cause the computer to
    monitor the one or more dynamic parameters;
    compare the one or more dynamic parameters to one or more thresholds; and
    notify the second user when the one or more dynamic parameters corresponds to the one or more thresholds.

32. The computer program product of claim 31, wherein the one or more thresholds includes one or more of a user customized threshold and a threshold automatically determined based on prior usage.

33. The computer program product of claim 31, wherein the one or more peripherals includes a plurality of printers of different types.

34. The computer program product of claim 31, wherein the one or more peripherals includes a plurality of peripherals requiring different components.

35. The computer program product of claim 33, wherein the one or more dynamic parameters comprises one or more of ink level, toner level, level of use, age of the one or more peripherals, and whether the one or more peripherals are operational.

36. The computer program product of claim 31, wherein to monitor the one or more dynamic parameters further comprises tracking past usage of the one or more peripherals and using the tracked past usage to select a threshold level.

37. The computer program product of claim 29, wherein to suggest the one or more items further comprises:
    retrieving user data including one or more of user preference data, purchase history data, the organizational data, and customer loyalty data;
    querying an item database, to find the one or more items, based at least in part on the user data and an identity of the one or more peripherals; and
    sending the one or more items for display to the second user.

38. The computer program product of claim 37, wherein the one or more items includes one or more of a replacement component, a recommendation of an item related to one of the one or more peripherals, and a promotion.

39. The computer program product of claim 37, wherein the instructions, when executed by the computer, further cause the computer to restrict the sending of the one or more items to the second user based on the organizational data that reflects the organizational preferences.

40. The computer program product of claim 39, wherein the instructions, when executed by the computer, further cause the computer to require an approval by one or more administrators of the organization and facilitating acquisition of the one or more items by the second user.

41. The computer program product of claim 40, wherein the instructions, when executed by the computer, further cause the computer to track the identity of the one or more peripherals and the one or more items and provide information linking the identity of the one or more peripherals and the one or more items to the one or more administrators.

42. The computer program product of claim 40, wherein the instructions, when executed by computer, further cause the computer to receive an order request and queuing the order request until the approval by the one or more administrators.

* * * * *